Aug. 14, 1956  M. F. MRACEK  2,758,565
CANINE SCENT DISCRIMINATION ARTICLE
Filed Dec. 15, 1954

INVENTOR:
MILO F. MRACEK
BY
Joseph T. Hipp
AGENT

United States Patent Office 2,758,565
Patented Aug. 14, 1956

2,758,565

CANINE SCENT DISCRIMINATION ARTICLE

Milo F. Mracek, St. Ann, Mo.

Application December 15, 1954, Serial No. 475,443

5 Claims. (Cl. 119—29)

This invention relates to articles used in obedience trials for dogs and more particularly to an improved article for use in judging dog performance in scent discrimination exercises.

Standards for obedience trial judging for dogs have been established by The American Kennel Club. In judging the scent discrimination exercises it is mandatory that certain point deductions be made for a dog that plays excessively with the article to be selected by scent and returned to the handler. Deductions are also made if the dog drops the article being retrieved and if there is noticeable mouthing of the article. In many instances the shape of the article being retrieved is largely responsible for these point deductions instead of the dog being judged. For example, if a relatively flat shaped article is dropped or placed on a sawdust surface it is not readily accessible to the retrieving dog. Furthermore the shape of the article also effects the ability of the dog in handling it. It was with these thoughts in mind that the invention to be disclosed was conceived.

One of the objects of this invention is to provide a novel scent discrimination article which presents a readily accessible gripping surface to a retrieving dog regardless of the resulting position of said article when it is dropped or placed on a smooth or irregular surface during a scent discrimination exercise.

Another object of the instant invention is to provide an improved scent discrimination article which automatically positions itself with respect to the gripping jaws of the retrieving dog to assist in the proper handling of said article by the dog.

Still another object of this invention is to provide an improved scent discrimination article which can readily be used in obedience trials regardless of the size of the participating dogs.

Still another object of this invention is to provide a scent discrimination article which is smooth, compact and rigid to facilitate and simplify the process of imparting a scent thereto.

Still another object of the invention is to provide a scent discrimination article designed to facilitate its handling and storage when not in actual use during obedience trials.

Other objects of the instant invention will be obvious from the description to follow taken in conjunction with the accompanying drawing.

Figure 1:
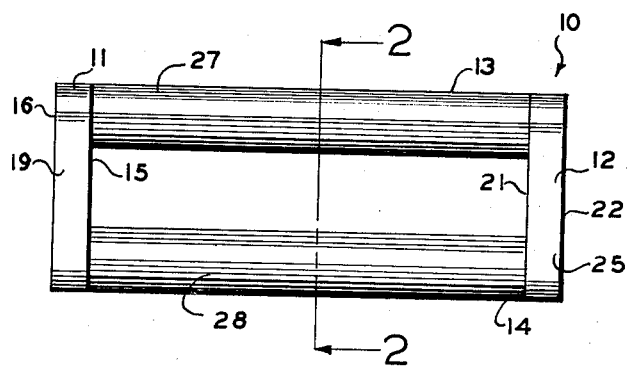
Figure 1 is a side elevational view of the preferred embodiment of my invention.
Figure 2:
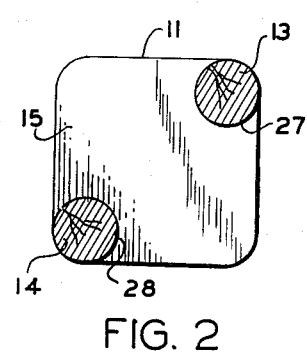
Figure 2 is a vertical sectional view taken on the line 2—2 of Figure 1.
Figure 3:
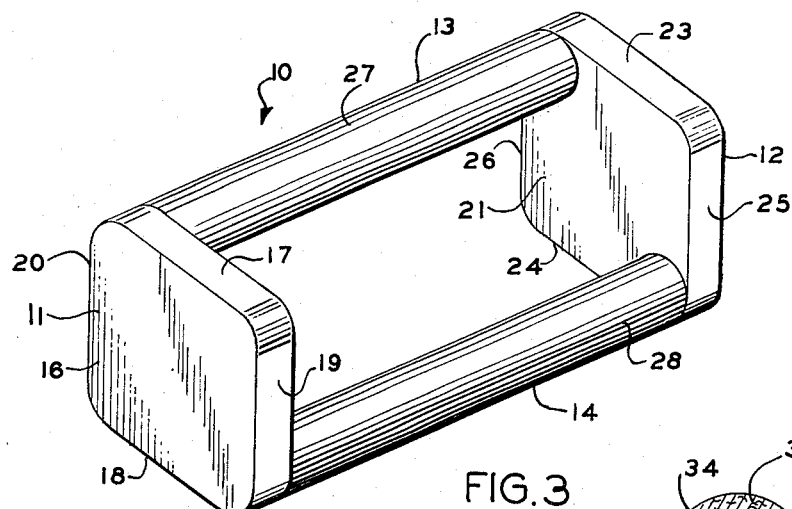
Figure 3 is a perspective view of the invention shown in Figures 1 and 2.

In reference to the drawings, particularly Figures 1 to 3 inclusive, the canine scent discrimination article 10 is shown being comprised essentially of end members 11 and 12 held in a spaced relationship by dowel rods 13 and 14 arranged in parallel therebetween.

The left end member 11 is preferably square shaped having an inner surface 15 and outer surface 16. The member 11 is also provided with four equal side surfaces or boundaries, namely horizontal surfaces 17 and 18 and vertical surfaces 19 and 20. Rounded corners are provided at the junction of the adjacent side surfaces having radii substantially equal to the radius of the dowel rods 13 and 14 to be described later. The right end member 12 is substantially identical to the left end member 11 having a corresponding inner surface 21 and outer surface 22. The right end member 12 is also provided with side surfaces or boundaries 23, 24, 25 and 26 corresponding to the surfaces 17, 18, 19 and 20 respectively on the opposing member 11. The end members 11 and 12 are constructed of the same material being of a hard wood, as shown, but may also be constructed of a light metal or leather.

The upper dowel rod 13 is of a one-piece construction being made of a relatively hard wood, as indicated in the partial cross section of Figure 2, but may too be fashioned from materials such as a light metal, leather or a combination of leather and wood, the latter to be described later. The rod 13 is preferably of a cylindrical shape, as indicated in Figures 1 to 3, providing for a smooth gripping surface 27. The left end of said rod 13 is held in an abutting relation with the inner surface 15 of the left end member 11 at a point immediately adjacent the junction of side surfaces 17 and 20 and is fixedly attached thereto by any suitable fastening means such as, for example, a drive screw, nail, glue or any combination thereof. If a drive screw or nail is used the sharp end thereof is placed against the outer surface 16 of the end member 11 with said screw or nail in alignment with the longitudinal axis of the rod 13 following which the screw or nail is forced through the end member 11 and into the left end of said rod. Similarly the right end of the dowel rod 13 is held against the inner surface 21 of the right end member 12 being secured to said member 12 at a point immediately adjacent the junction of side surfaces 23 and 26 by the same fastening arrangement used to secure the left end of rod 13 to the left end member 11.

The lower dowel rod 14 is substantially identical to and diametrically or diagonally opposite the upper dowel rod 13 and is also constructed of a hard wood as indicated in Figure 2 but which may be of a light metal, leather or leather and wood combination as in the case of the rod 13. The rod 14, Figures 1 to 3, is of a cylindrical nature providing a gripping surface 28 corresponding to surface 27 of rod 13. The left end of said rod 14 is secured to the end member 11 being held in an abutting relation with the inner surface 15 of said end member at a point immediately adjacent the junction of side surfaces 18 and 19 by any suitable fastening means such as that referred to above in regard to rod 13. The opposite end of the dowel rod 14 abuts inner surface 21 of right end member 12 being secured thereto at a point immediately adjacent the junction of side surfaces 24 and 25 in the same manner used in securing the left end of said rod.

In conformity with the standards established for obedience trials it is essential that the dowel rods 13 and 14 be constructed of the same material whether it be wood, metal, leather or combination of wood and leather. Furthermore the end members 11 and 12 must be of the same material as the dowel rods 13 and 14, or at least of the same material comprising the outer surfaces of said dowel rods as will be further described below. Although it is not feasible to construct the parts comprising the discrimination article 10 of anything other than that mentioned above it is possible that in the future other materials such as plastic and rubber will be acceptable.

In the event the end members 11 and 12 and dowel rods 13 and 14 are constructed of a light weight metal the article 10 could be "cast" as one piece whereby rods 13 and 14 would be integral with the end members 11 and 12. This would eliminate the necessity of using fastening means as suggested above but would not change the basic design as shown in Figures 1 to 3 inclusive.

Figure 4:
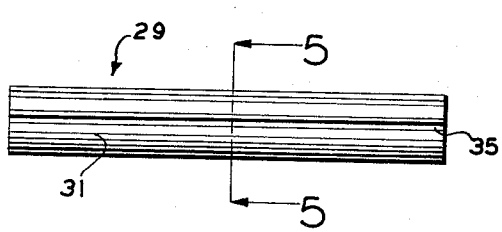
Figure 4 is a fragmentary view showing a modification of the preferred embodiment.
Figure 5:
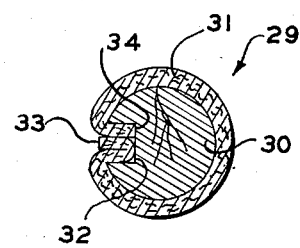
Figure 5 is an enlarged sectional view taken on the line 5—5 of Figure 4.

In reference to Figures 4 and 5 of the drawing a slightly modified dowel rod 29 is shown being comprised of an inner wooden cylinder 30 and an outer leather covering 31. The cylinder 30 is provided with a groove 32 in its outer periphery being arranged parallel with the axis of said cylinder and extending the entire length thereof. The leather covering 31 which is pre-cut to a rectangular shape, is wrapped around the cylinder 30 and secured thereto by the use of a suitable adhesive. The free ends 33 and 34 of the covering 31 are forced into the groove 32 to strengthen the bond between said covering and the cylinder 30 and to prevent interference with the gripping of the dowel rod, however a slight outer groove 35, Figure 4, remains visible after the covering 31 is applied to the cylinder 30.

Leather covered dowel rods, as depicted by rod 29 in Figures 4 and 5, may be substituted in the place of rods 13 and 14, Figure 3. In this instance it would be necessary to use end members 11 and 12 made of leather. The use of the leather covered dowel rods and leather end members would not change the basic design or construction shown in Figure 3.

Having described the component parts of the invention and its construction in detail the use of said invention as in a typical scent discrimination exercise will now be described.

Prior to the exercise the scent discrimination articles, as represented by article 10 shown in Figure 3, are thoroughly washed to remove all traces of scent which may have been imparted thereto during previous handling by the handler of the participating dog. At the beginning of the exercise a specific number of the articles untouched by the handler are placed in a group at a given distance from the handler and dog who are required to face an opposite direction during the placing of said articles. Other pre-selected articles have the scent of the handler imparted thereto and are then individually and successively placed at random among the unscented articles unseen by the handler and participating dog. The handler subsequently places his hand on the nose of the dog to acquaint said dog with the scent and then gives the signal for the dog to proceed to the group of articles for the purpose of selecting and retrieving the article scented by the handler. Upon identifying the scented article it is picked up by the dog and returned to the handler. The same procedure is repeated as the remaining pre-selected articles having the scent of the handler imparted thereto are individually placed among the untouched or unscented articles.

Assuming one of the articles to be retrieved is resting upon side surfaces 18 and 24 of end members 11 and 12 respectively, the dog will grasp the upper dowel rod or bar 13 between its jaws in effort to pick up the article and return it to the handler. In the event the dog has a loose grip on the upper bar 13, assuming the lower rod 14 is on the opposite side of said bar 13 from said dog, the article will automatically turn or pivot about the axis of rod 13 in a clockwise direction causing the lower rod 14 to swivel under the lower jaw of the dog. As a result it becomes almost impossible for the dog to drop the article being retrieved.

It is obvious from the above that regardless of how the article is positioned either rod 13 or rod 14 will be off the ground or floor to present a readily accessible gripping surface to the retrieving dog. For example if the article 10 is rotated 90° about its longitudinal axis the rod 13 becomes the lower bar and rod 14 becomes the upper bar, the latter being the one grasped by the dog. Contrary to previously known types of discrimination articles the instant device always presents an accessible gripping surface to the dog even when said device is placed in loose dirt, sawdust and the like covering the surface of the ground or floor.

From the foregoing description it should be obvious to those skilled in the art that there can be certain modifications or changes in size and shape, as for example by making the end members rectangular instead of square as described, without departing from the spirit or scope of the invention.

What is claimed is:

1. A canine scent discrimination article comprising left and right end members, each of said members having inner and outer surfaces with a plurality of side surfaces interposed therebetween, and a pair of diametrically opposed parallel rod members connecting said end members, said rod members joining the inner surfaces of said end members at points immediately adjacent the junction of adjoining side surfaces.

2. A canine scent discrimination article comprising a pair of spaced end members each having inner and outer surfaces, and a pair of diagonally-opposed rod members connecting said end members, said rod members joining the inner surfaces of said end members substantially at the outer boundaries thereof.

3. The structure as set forth in claim 2 wherein the diagonally-opposed rod members are integral with the end members.

4. The structure as set forth in claim 2 wherein each of the diagonally-opposed rod members are comprised of a cylindrical inner member and an outer cover member co-extensive therewith and secured thereto.

5. The structure as set forth in claim 2 wherein the end members are provided with a plurality of side surfaces and rounded corners at the junction of adjoining side surfaces and the diagonally-opposed rod members are provided with a cylindrical cross section each having a radius substantially equal to the radius of each of said rounded corners.

References Cited in the file of this patent

UNITED STATES PATENTS

| | | |
|---|---|---|
| 745,806 | Erb | Dec. 1, 1903 |
| 2,555,531 | Boord | June 5, 1951 |
| 2,690,032 | Zalkind | Sept. 28, 1954 |